(12) United States Patent
Vogt et al.

(10) Patent No.: US 12,459,153 B2
(45) Date of Patent: Nov. 4, 2025

(54) SAW GUIDES FOR GANG SAWS

(71) Applicant: Precision Guide Machinery and Repair Limited, Prince George (CA)

(72) Inventors: Nalynd Vogt, Prince George (CA); Carrick Bergen, Prince George (CA); Nathan Pacholko, Prince George (CA)

(73) Assignee: PRECISION GUIDE MACHINERY AND REPAIR LIMITED, Prince George (CA)

( * ) Notice: Subject to any disclaimer, the term of this patent is extended or adjusted under 35 U.S.C. 154(b) by 290 days.

(21) Appl. No.: 18/075,236

(22) Filed: Dec. 5, 2022

(65) Prior Publication Data

US 2023/0173595 A1  Jun. 8, 2023

Related U.S. Application Data

(60) Provisional application No. 63/285,615, filed on Dec. 3, 2021.

(51) Int. Cl.
| | |
|---|---|
| *B27B 5/34* | (2006.01) |
| *B23D 45/02* | (2006.01) |
| *B23D 45/10* | (2006.01) |
| *B23D 47/02* | (2006.01) |

(52) U.S. Cl.
CPC .............. *B27B 5/34* (2013.01); *B23D 45/021* (2013.01); *B23D 47/02* (2013.01); *B23D 45/10* (2013.01)

(58) Field of Classification Search
CPC .... B27B 3/34; B27B 3/36; B27B 3/38; B27B 3/12; B27B 5/34; B23D 47/005; B23D 59/02; B23D 59/002; B23D 59/005; B23D 45/10; B23D 7/02; Y10T 83/8878; Y10T 83/8886; Y10T 83/8889; Y10T 83/7847; Y10T 83/7876; Y10T 83/293
See application file for complete search history.

(56) References Cited

U.S. PATENT DOCUMENTS

| | | | | |
|---|---|---|---|---|
| 4,323,145 A | * | 4/1982 | Allen ................. | B23Q 11/0032 181/209 |
| 4,961,359 A | * | 10/1990 | Dunham .............. | B23D 47/005 83/171 |
| 5,159,866 A | * | 11/1992 | Dunham .............. | B23D 47/005 83/824 |

* cited by examiner

*Primary Examiner* — Jennifer S Matthews
(74) *Attorney, Agent, or Firm* — Oyen Wiggs Green & Mutala LLP

(57) ABSTRACT

A saw guide for attachment to a guide post of a saw guide arbor guide assembly includes a head and a body. The head is attached to the guide post. The head includes opposed first and second head surfaces, a collar wall, and a head sidewall. The collar wall extends between the first and second head surfaces, with the collar wall engaging with the guide post. The head sidewall extends between the first and second head surfaces and defines an outer perimeter of the head. The body is attached to the head and includes opposed first and second body surfaces and a body sidewall. The body sidewall extends between the first and second body surfaces and defines an outer perimeter of the body. The saw guide further includes a lattice structure extending within at least the body, with the lattice structure extending between the first and second body surfaces.

14 Claims, 11 Drawing Sheets

SAW GUIDES FOR GANG SAWS

CROSS-REFERENCE TO RELATED APPLICATIONS

This application claims the benefit of U.S. Provisional Patent Application No. 63/285,615 filed Dec. 3, 2021.

FIELD OF THE INVENTION

The present invention relates to gang saws, and in particular, to saw guides for gang saws.

BACKGROUND OF THE INVENTION

In a typical gang saw, a plurality of parallel circular saw blades are mounted on a rotating arbor to form a gang saw assembly. A saw guide assembly is provided for each gang saw assembly. The saw guide assembly comprises a plurality of saw guides attached to a guide post. The saw guides and the saw blades are configured such that each saw blade engages the saw guide assembly in between two adjacent saw guides. The saw blades rotate at high speeds in order to cut logs into individual boards.

During operation, the saw blades may get quite hot. If a saw blade becomes too hot, there may be very adverse consequences to the general state of the equipment (i.e. the saw blades and/or the saw guides may become damaged) and to the quality of the resulting lumber product. In particular, high temperatures for extended periods of time may result in earlier than expected failure of the saw blades and/or the saw guides.

In order to provide cooling and general lubrication to the saw blades, it is typical to provide lubricants to the saw blades and/or the saw guides. Lubricants may include air, oil, water, or a mixture of air, oil and/or water. These lubricants are typically supplied through channels or pathways formed within the saw guides. Typically, saw guides are formed from solid metal, such as aluminum. However, such saw guides are typically relatively heavy and expensive to manufacture (from a materials perspective).

It is therefore an objective of the invention to provide an improved saw guide that is lighter and less expensive to manufacture but still strong enough to function in a saw guide assembly.

SUMMARY OF THE INVENTION

In accordance with one embodiment of the invention, a saw guide for a saw arbor guide assembly comprises a head and a body. The body comprises first and second body surfaces, with a sidewall extending between the first and second surfaces. Preferably, the interior of the body and the head comprises a lattice structure comprising a plurality of cells. The cells may be hexagonal or circular in shape.

In another embodiment, the lattice structure comprises a plurality of cylindrical rods that are oriented at orthogonal angles to each other.

One or more of the lattice structure, the first and second surfaces, and the sidewall may be made from metal and manufactured using 3D printing techniques.

In still another embodiment, a saw guide for attachment to a guide post of a saw guide arbor guide assembly comprises a head and a body. The head is adapted to be attached to the guide post. The head comprises opposed first and second head surfaces, a collar wall, and a head sidewall. The collar wall extends between the first and second head surfaces, with the collar wall adapted to engage with the guide post. The head sidewall extends between the first and second head surfaces and defines, at least in part, an outer perimeter of the head. The body is attached to the head and comprises opposed first and second body surfaces and a body sidewall. The body sidewall extends between the first and second body surfaces and defines, at least in part, an outer perimeter of the body. The saw guide further comprises a lattice structure extending within at least the body, with the lattice structure extending between the first and second body surfaces.

In yet another embodiment, the lattice structure further extends within the head, with the lattice structure extending between the first and second head surfaces.

In a further embodiment, the lattice structure is bound horizontally, at least in part, by the collar wall, the head sidewall, and the body sidewall.

In still a further embodiment, the lattice structure is bound vertically, at least in part, by the first and second head surfaces and the first and second body surfaces.

In yet another embodiment, the lattice structure comprises a plurality of repeating hexagonal cells. The hexagonal cells are defined by a plurality of cell walls.

In still yet another embodiment, the cell walls extend between the first and second body surfaces.

In a further embodiment, the cell walls extend substantially perpendicularly to the first and second body surfaces.

In another embodiment, the lattice structure comprises a plurality of repeating circular cells. The circular cells are defined by a circular cell wall.

In yet another embodiment, the lattice structure comprises a plurality of repeating rod structures. The rod structures comprise a central point and a plurality of rods extending from the central point.

In still yet another embodiment, the plurality of rods comprises three rods.

In a further embodiment, the three rods extend from the central point substantially orthogonal to each other.

In still another embodiment, the rods are substantially cylindrical in shape.

In still yet another embodiment, a saw guide for attachment to a guide post of a saw guide arbor guide assembly comprises a head and a body. The head is adapted to be attached to the guide post. The head comprises opposed first and second head surfaces, a collar wall, and a head sidewall. The collar wall extends between the first and second head surfaces, with the collar wall adapted to engage with the guide post. The head sidewall extends between the first and second head surfaces and defines, at least in part, an outer perimeter of the head. The body is attached to the head and comprises opposed first and second body surfaces and a body sidewall. The body sidewall extends between the first and second body surfaces and defines, at least in part, an outer perimeter of the body. The saw guide further comprises one or more enclosed cavities extending within the saw guide.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which.

DETAILED DESCRIPTION OF THE INVENTION

Figure 1:
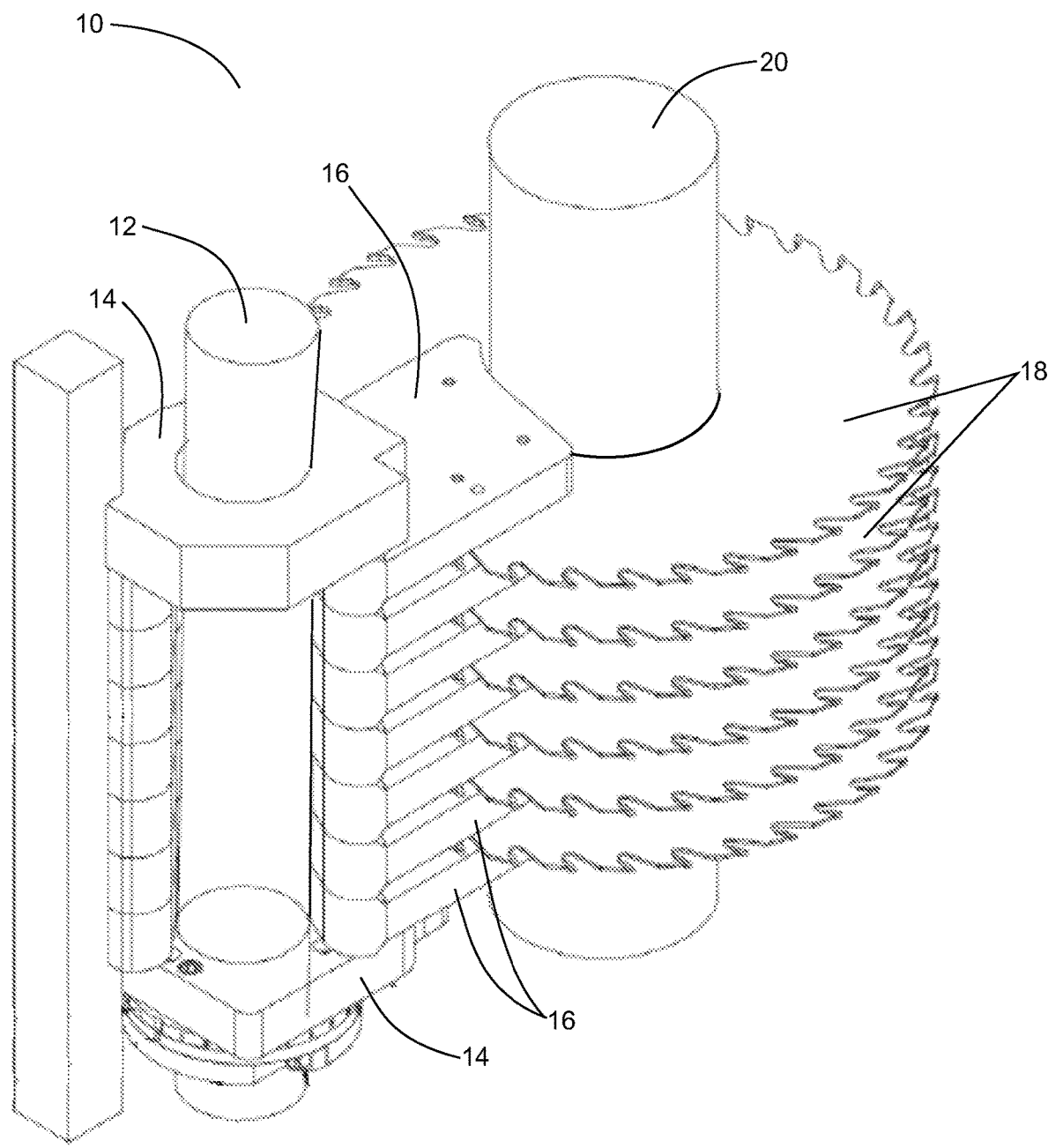
FIG. 1 depicts a saw arbor guide assembly.

Referring to FIG. 1, a saw arbor guide assembly 10 comprises a guide post 12 and a plurality of saw guides 16. One or more guide manifolds 14 may be mounted on the guide post 12. The guide post 12 may be substantially cylindrical in shape, but other shapes and configurations for the guide post 12 are also possible. The plurality of saw guides 16 are arranged, generally in a stacked configuration, on the guide post 12, as shown in FIG. 1. The location and spacing of the saw guides 16 are such so as to allow them to interact with one or more saw blades 18 that are attached to a rotating arbor 20 during cutting operation. In particular, the saw guides 16 are preferably arranged such that one of the saw blades 18 travels in between two adjacent ones of the saw guides 16 during operation.

The saw arbor guide assembly 10 depicted in FIG. 1 is a vertical single arbor (VSA) configuration (with a single set of saw guides 16 and a single set of saw blades 18 arranged vertically). It is understood that other configurations are also possible, such as a vertical double arbor (VDA) configuration (with two sets of saw guides 16 and two sets of saw blades 18 arranged vertically), a horizontal single arbor (HSA) configuration (with a single set of saw guides 16 and a single set of saw blades 18 arranged horizontally), a horizontal double arbor (HDA) configuration (with two sets of saw guides 16 and two sets of saw blades 18 arranged horizontally), and a quad configuration (with four sets of saw guides 16 and four sets of saw blades 18 arranged horizontally or in some other configuration).

Figure 2:
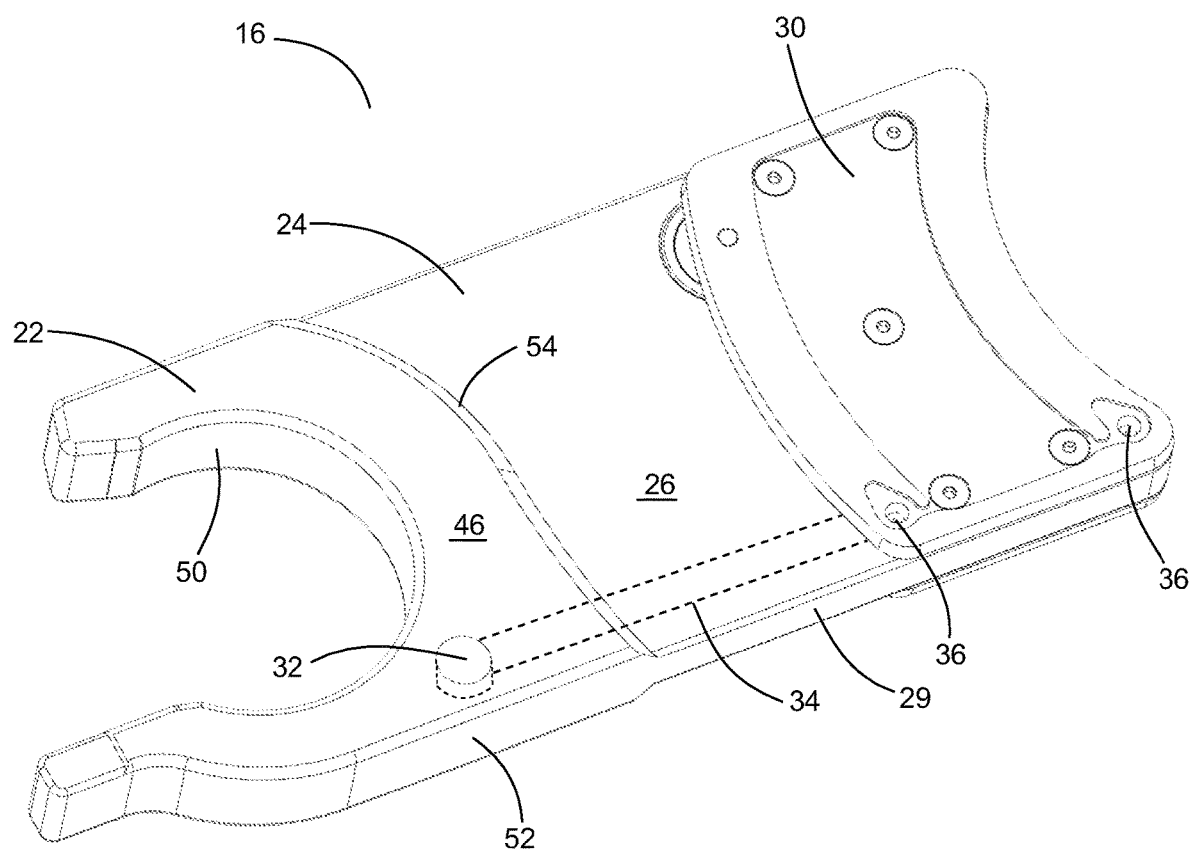
FIG. 2 is a top perspective view of a saw guide.
Figure 3:
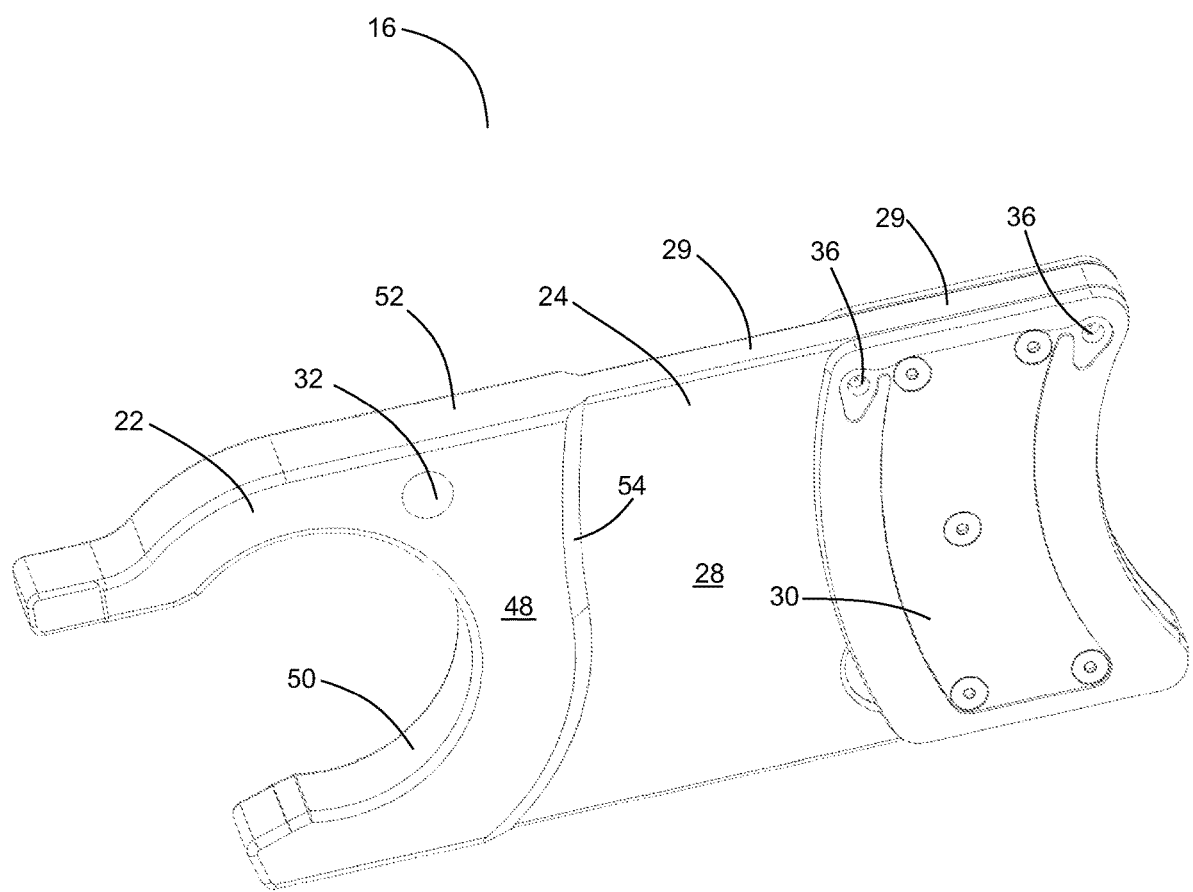
FIG. 3 is a bottom perspective view of the saw guide of FIG. 2.
Figure 4:
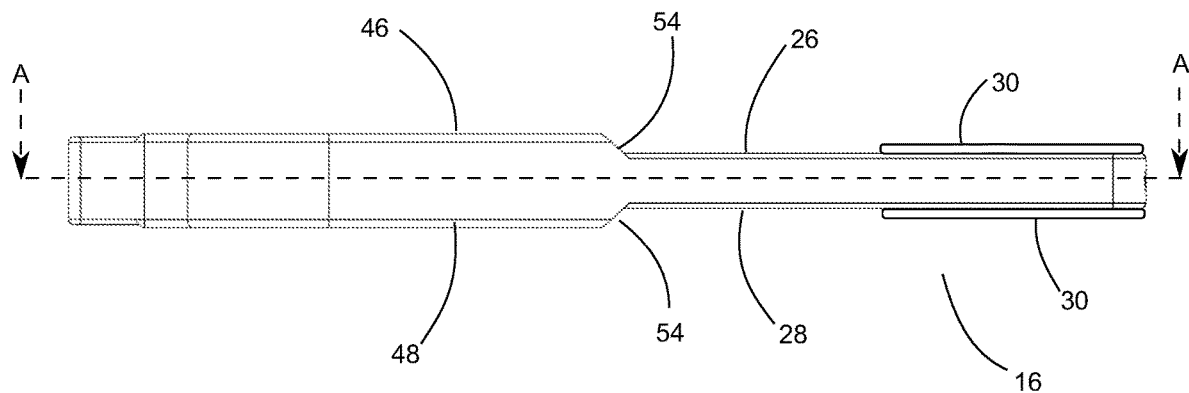
FIG. 4 is a front view of the saw guide of FIG. 2.

FIGS. 2 to 4 depict an example of the saw guides 16. The saw guide 16 comprises a head 22 and a body 24. The head 22 is attached to the body 24. Preferably, the head 22 and the body 24 are integrally attached. The head 22 is adapted to attach to the guide post 12, while the body 24 is adapted to, in conjunction with adjacent ones of the saw guides 16, interact with one or more of the saw blades 18. In other words, the saw blades 18 are configured to rotate or spin between adjacent ones of the saw guides 16.

The head 22 comprises opposing first and second head surfaces 46, 48. The head 22 further comprises a collar wall 50 extending between the first and second head surfaces 46, 48. The collar wall 50 is adapted to engage with the guide post 12 when the saw guide 16 is attached to the guide post 12. The head 22 further comprises a head sidewall 52 extending between the first and second head surfaces 46, 48. The head sidewall 52 extends substantially along an exterior perimeter of the head 22. Preferably, the collar wall 50 is substantially continuous with the head sidewall 52.

The body 24 comprises opposing first and second body surfaces 26, 28, with a body sidewall 29 extending between the first and second body surfaces 26, 28. The body sidewall extends substantially along a perimeter of the body 24. Preferably, the body sidewall 29 is substantially continuous with the head sidewall 52. Referring FIG. 3, the head 22 is preferably greater in depth than the body 24, such that a distance between the first and second head surfaces 46, 48 is preferably greater than a distance between the first and second body surfaces 26, 28. Because of the difference in depth between the head 22 and the body 24, the saw guide 16 may further comprise a transition surface 54 between the first head surface 46 and the first body surface 26 and/or between the second head and/or between the second head surface 48 and the second body surface 28.

Preferably, one or both of the first and second body surfaces 26, 28 are adapted to accommodate a generally flat support pad 30 for interacting with the saw blades 18. When interacting with the saw blades 18, the support pads 30 preferably do not come into physical contact with the saw blades 18; however, the support pads 30 assist in providing cooling and/or lubrication to the saw blades 18 when the saw blades 18 are rotating (i.e. during cutting operation). For ease of illustration, FIGS. 2 to 4 only show a single one of the saw guides 16, but it is understood that the saw blade 18 may be located in between two of the saw guides 16 (for example, as shown in FIG. 1).

The head 22 comprises one or more intake channels 32 for supplying lubricant to the saw guide 16. Preferably, the intake channels 32 extend substantially parallel to the guide post 12 and extend for an entire depth of the head 22. In this manner, when the saw guides 16 are stacked on top of each other (and attached to the guide post 12), the intake channels 32 for each of the saw guides 16 are preferably aligned with one another and form a common through-passage for the lubricant to flow. This allows the lubricant to flow through each of the saw guides 16.

Figure 5:
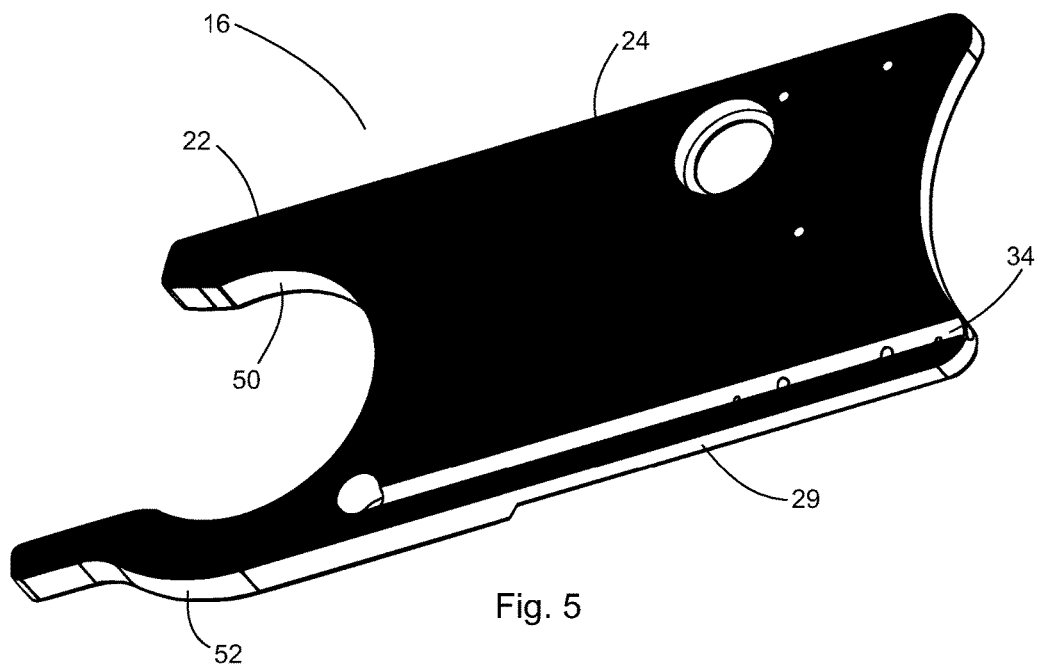
FIG. 5 is a cross-sectional view of the saw guide of FIG. 4, taken along A-A.
Figure 6:
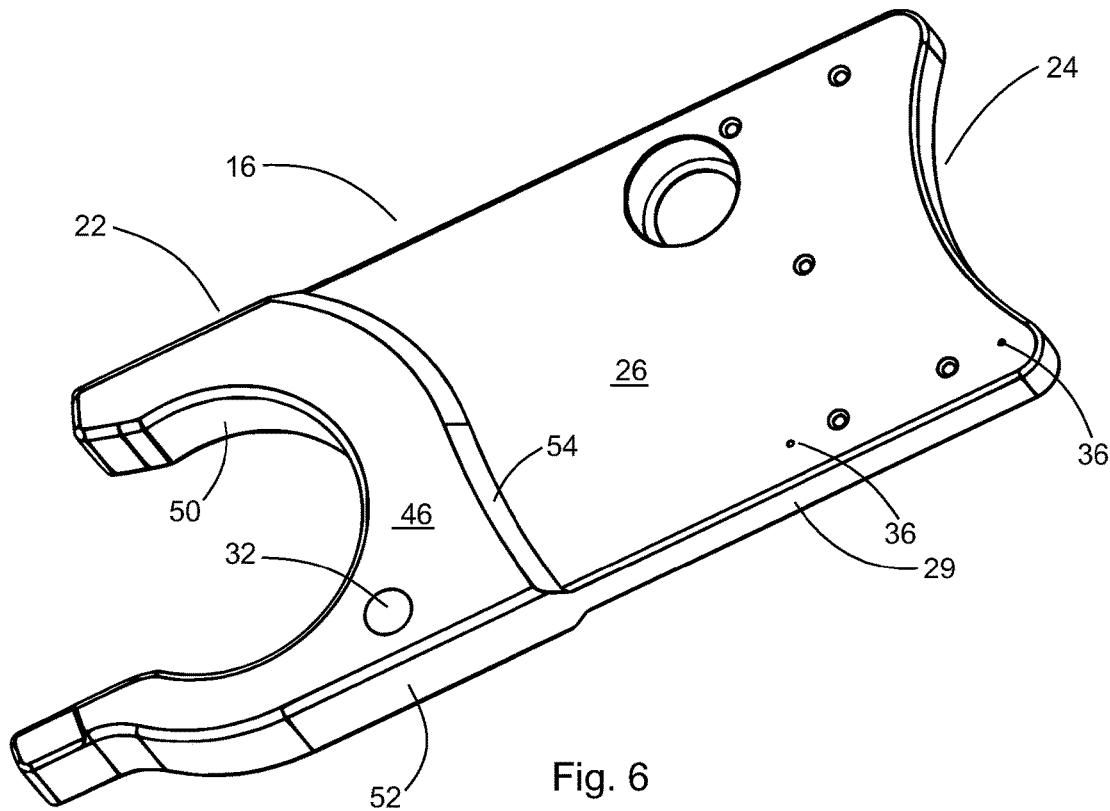
FIG. 6 depicts a top perspective view of a saw guide in accordance with one embodiment of the invention.
Figure 7:
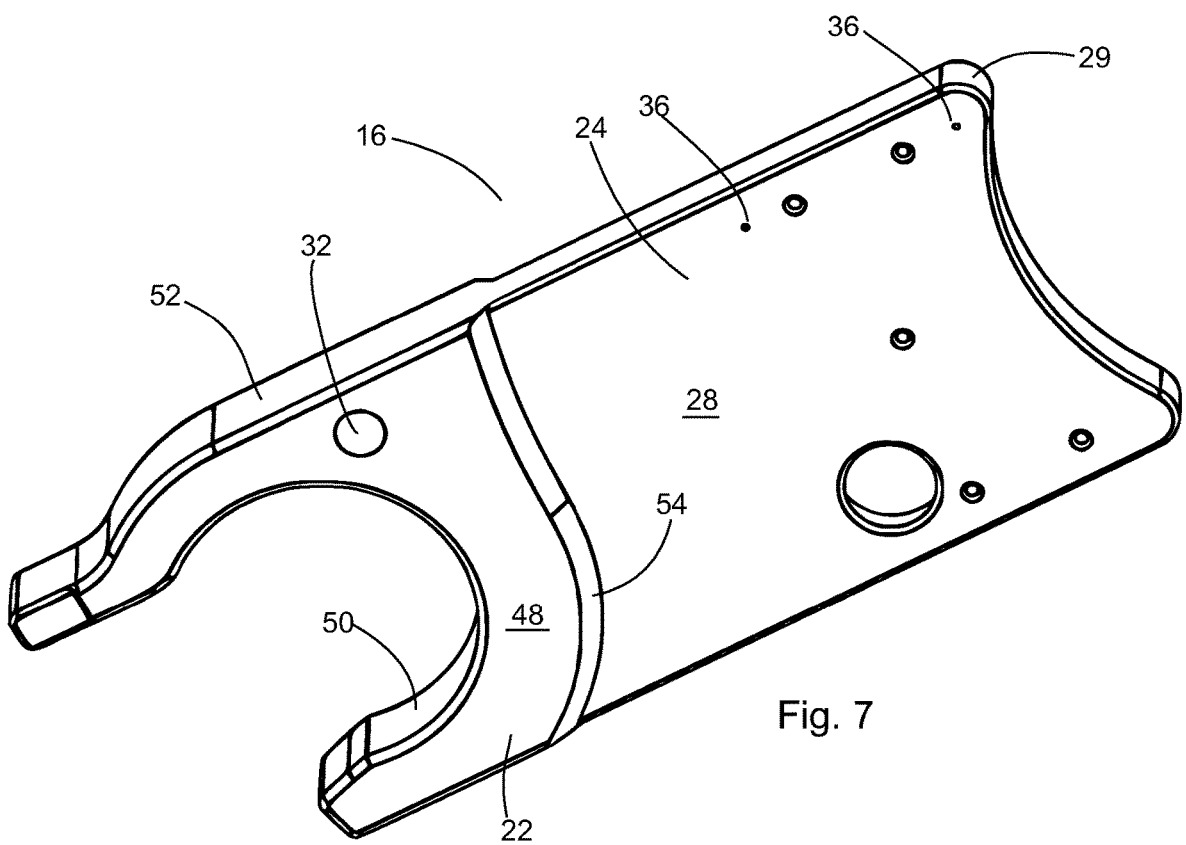
FIG. 7 depicts a bottom perspective view of the saw guide of FIG. 6.
Figure 8:
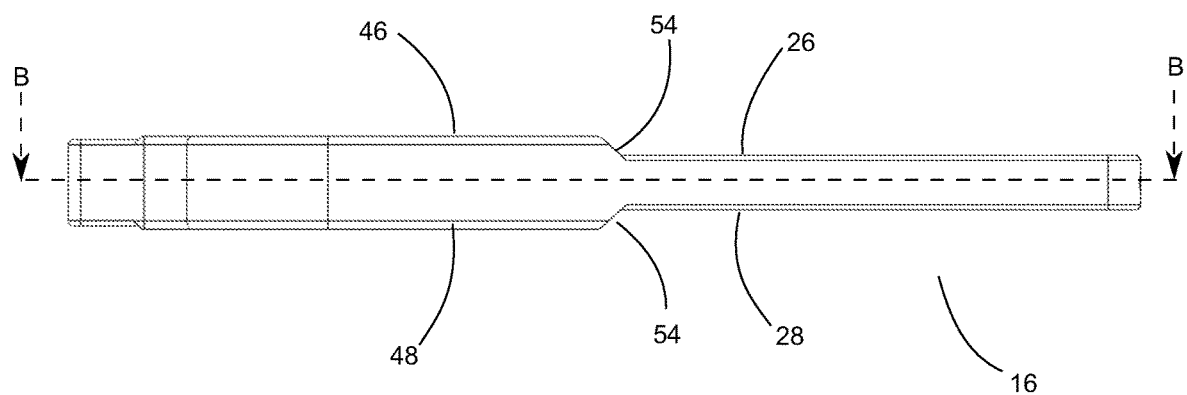
FIG. 8 is a front view of the saw guide of FIG. 6.

Furthermore, one or more passages 34 (best seen in FIG. 5, which is a cross-sectional view of the saw guide 16) are formed within the saw guide 16 and extend from the intake channels 32. The passages 34 extends through the head 22 and into the body 24. One or more lubricant openings 36 are formed on one or both of the first body surface 26 or the second body surface 28. As such, the passages 34 are not enclosed but instead open to one or both of the first body surface 26 or the second body surface 28.

The passages 34 connect the intake channels 32 to the lubricant openings 36, thereby allowing the lubricant to flow from the intake channels 32 to the lubricant openings 36. The passages 34 may need to split or branch into multiple ones of the passages 34 in order to ensure that each of the lubricant openings 36 are connected to the intake channels 32.

Typically, conventional examples of the saw guide 16 are made from solid metal, such as aluminum. The interior of the saw guide 16 is substantially solid (i.e. not hollow), as shown, for example, in the cross-sectional view of FIG. 5, except for sections such as the passages 34, the intake channels 32, and the lubricant openings 36.

Figure 9:
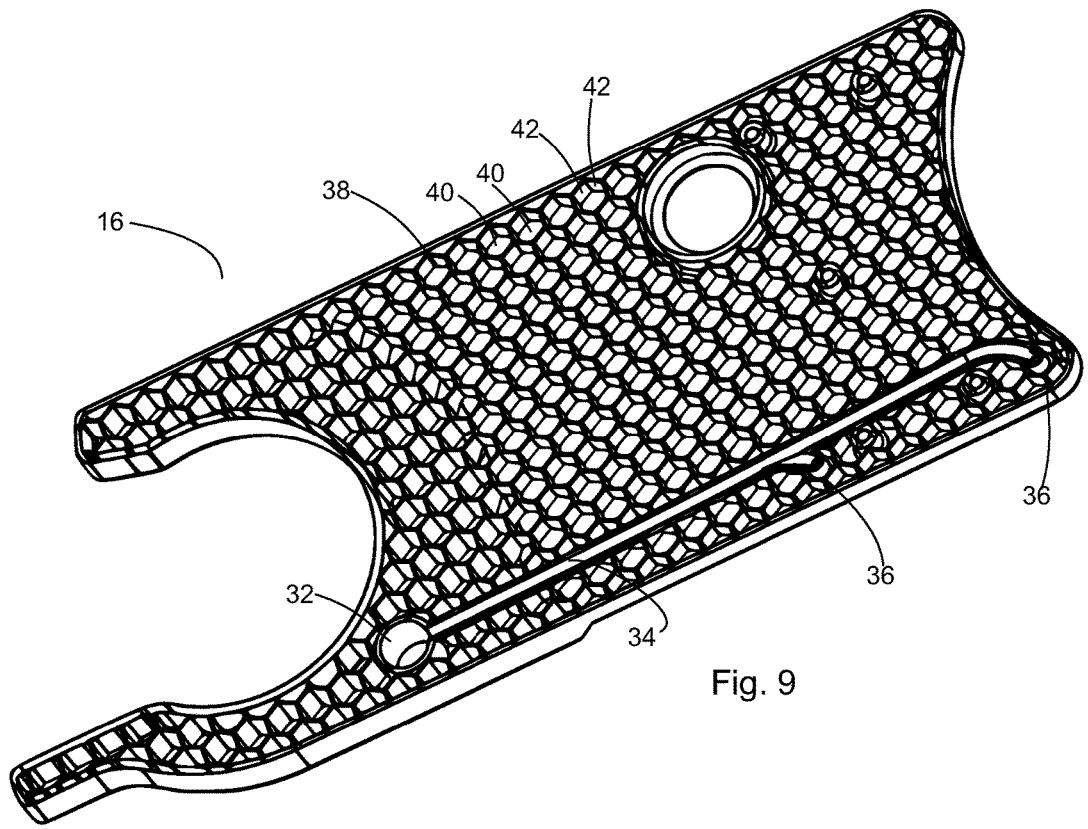
FIG. 9 is a cross-sectional view of the saw guide of FIG. 8, taken along B-B.
Figure 10:
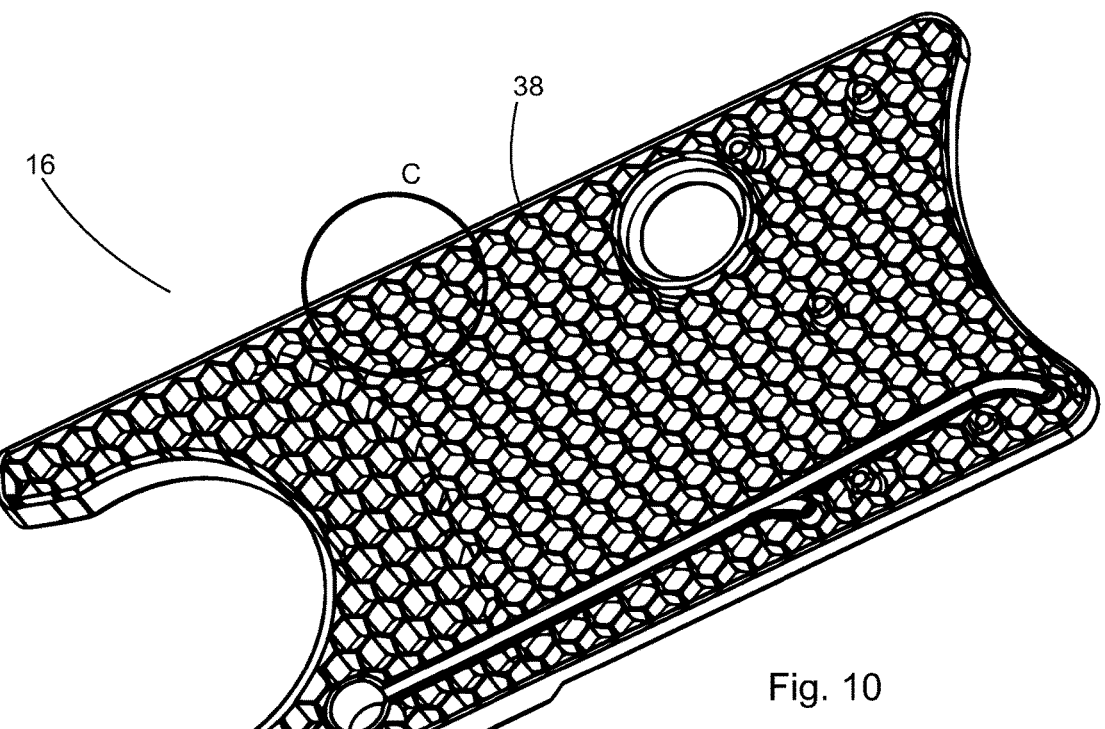
FIG. 10 is another cross-sectional view of the saw guide of FIG. 8.

FIGS. 6 to 11 depict an embodiment of the saw guide 16 (shown without the support pads 30) in accordance with the invention. The exterior of the saw guide 16 of FIGS. 6 to 11 is substantially similar to that of conventional saw guides; however, the interior of the saw guide 16 is not substantially solid but instead comprises a lattice structure 38 comprising a plurality of repeating cells 40, as best shown in the cross-sectional view of FIG. 9. The lattice structure 38 preferably extends in both the head 22 and the body 24. For example, the lattice structure 38 may extend between the first body surface 26 and the second body surface 28 and between the first head surface 46 and the second head surface 48. In addition, the lattice structure 38 may extend in the body 24 as bounded by the body sidewall 29. The lattice structure 38 may extend in the head 22 as bounded by the collar wall 50 and the head sidewall 52. However, it is also understood that, instead of extending in substantially an entirety of the head 22 and the body 24 (as shown in FIG. 9), the lattice structure 38 may only extend in a portion of the head 22 or a portion of the body 24. In such cases, the remaining portions of the head 22 and/or the body 24 may still be formed from solid metal.

Where the lattice structure 38 extends in both the head 22 and the body 24, the lattice structure 38 may be bound horizontally, at least in part, by the head sidewall 52, the collar wall 50, and the body sidewall 29. Furthermore, the lattice structure 38 may be bound vertically, at least in part, by the first and second body surfaces 26, 28, the first and second head surfaces 46, 48, and the transition surface(s) 54.

Figure 11:
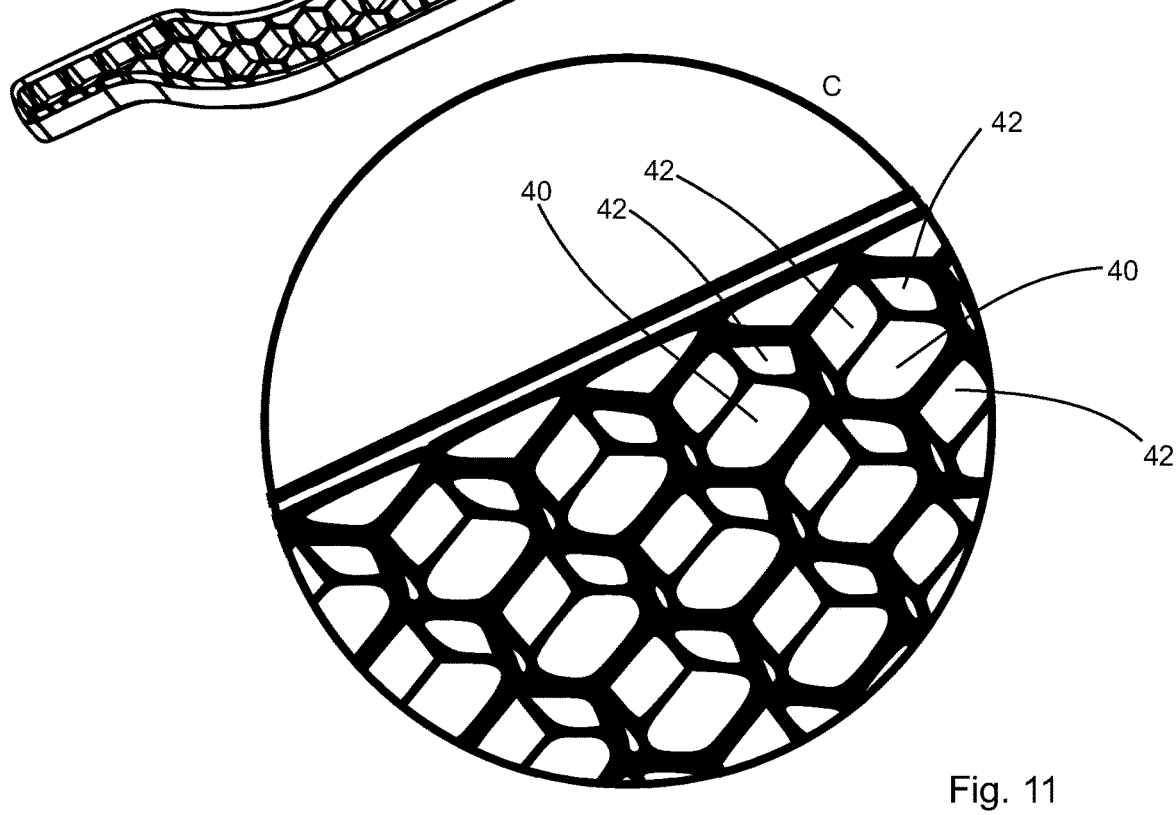
FIG. 11 is a magnified view of section C of FIG. 10.
Figure 12:
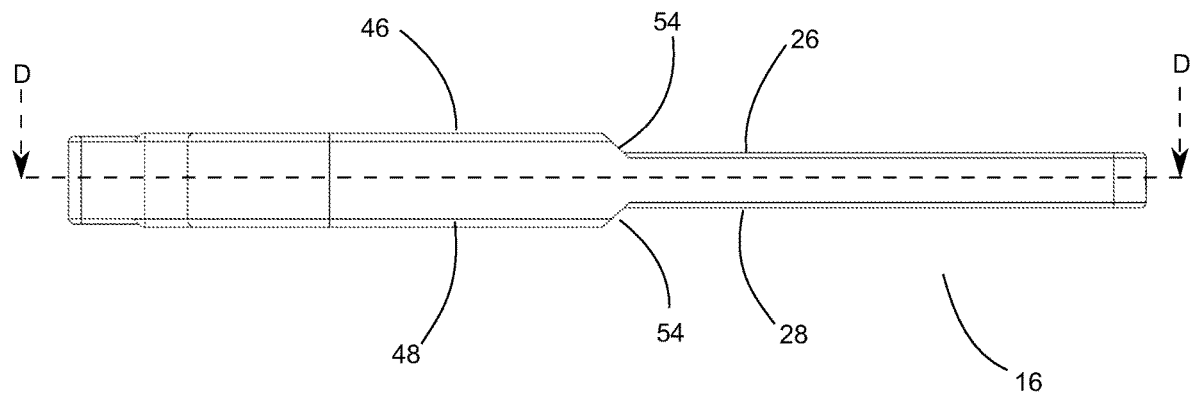
FIG. 12 is a front view of a saw guide in accordance with another embodiment of the invention.

The cells 40 may be substantially hexagonal in shape, with each cell 40 comprising six cell walls 42, as best shown in FIG. 11, which is a magnified view showing the cells 40. Preferably, the cells 40 are enclosed. Some of the cell walls 42 may be shared between adjacent ones of the cells 40. Preferably, the cell walls 42 within the body 24 are substantially perpendicular to the first and second body surfaces 26, 28, while the cell walls 42 within the head 22 are substantially perpendicular to the first and second head surfaces 46, 48.

As shown in FIG. 9 the lattice structure 38 preferably extends throughout substantially an entirety of the interior of the head 22 and the body 24. For example, the lattice structure 38 may extend within at least the body 24, with the cell walls 42 extending between the first and second body surfaces 26, 28 and bounded by the body sidewall 29. The passages 34 and the intake channels 32 are accommodated and located within the lattice structure 38, as shown in FIG. 9.

One or more of the first and second body surfaces 26, 28, the body sidewall 29, the first and second head surfaces 46, 48, the head sidewall 52, the collar wall 50, and the cell walls 42 may be made from metal (including, but not limited to, aluminum or steel) and may be manufactured using 3D printing techniques. By using the lattice structure 38 for the interior of the saw guide 16 (instead of having a solid metal interior), the weight of the saw guide 16 may be reduced. In addition, less material would be required to manufacture the saw guide 16. Even though less material would be required, the geometry of the lattice structure 38 provides strength and rigidity to the saw guide 16.

In addition, by using 3D printing techniques, the passages 34 are no longer required to be substantially straight but may be curved (as shown, for example, in FIG. 9).

Figure 13:
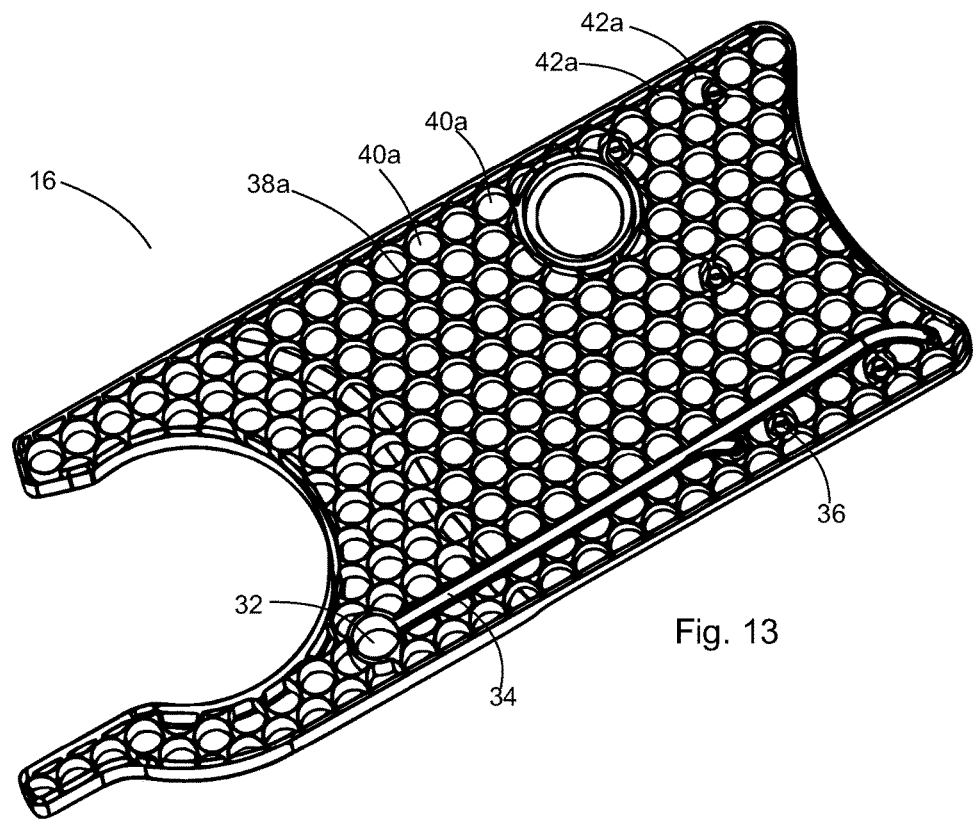
FIG. 13 is a cross-sectional view of the saw guide of FIG. 12, taken along D-D.
Figure 14:
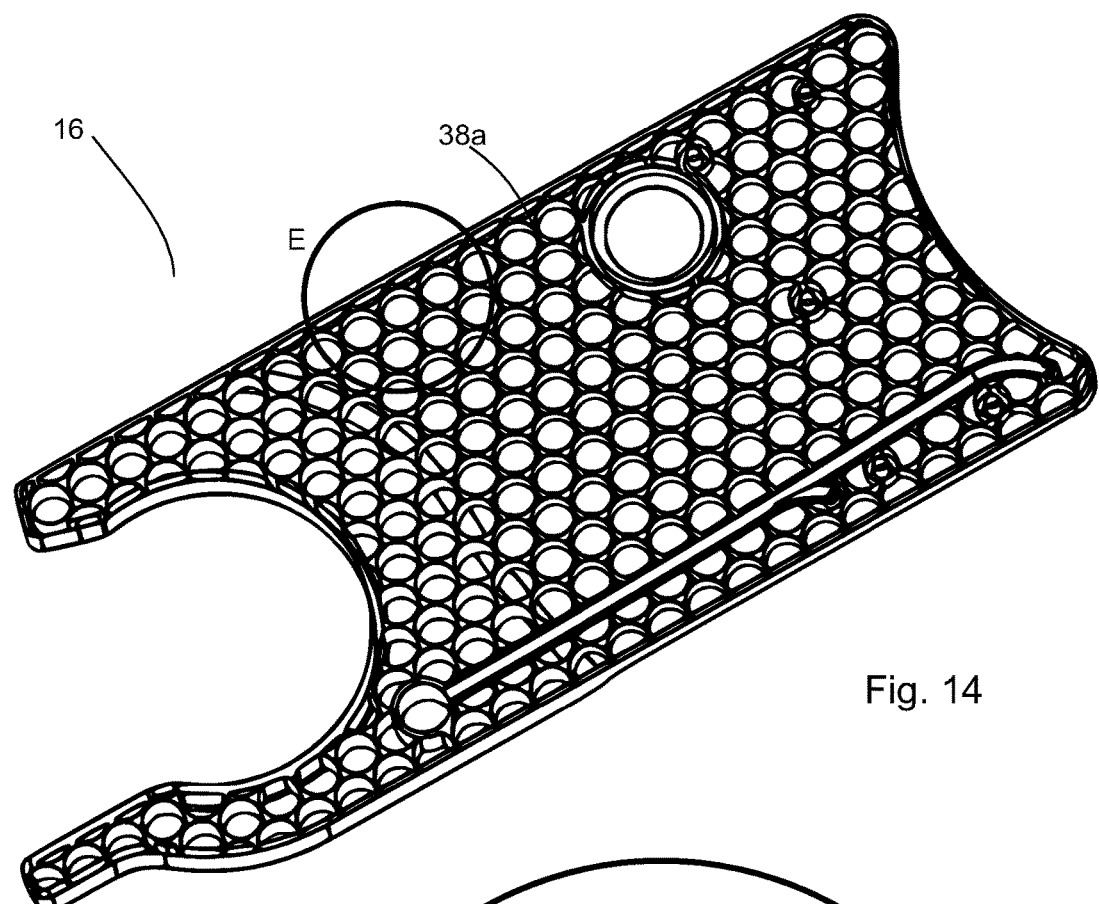
FIG. 14 is another cross-sectional view of the saw guide of FIG. 12.
Figure 15:
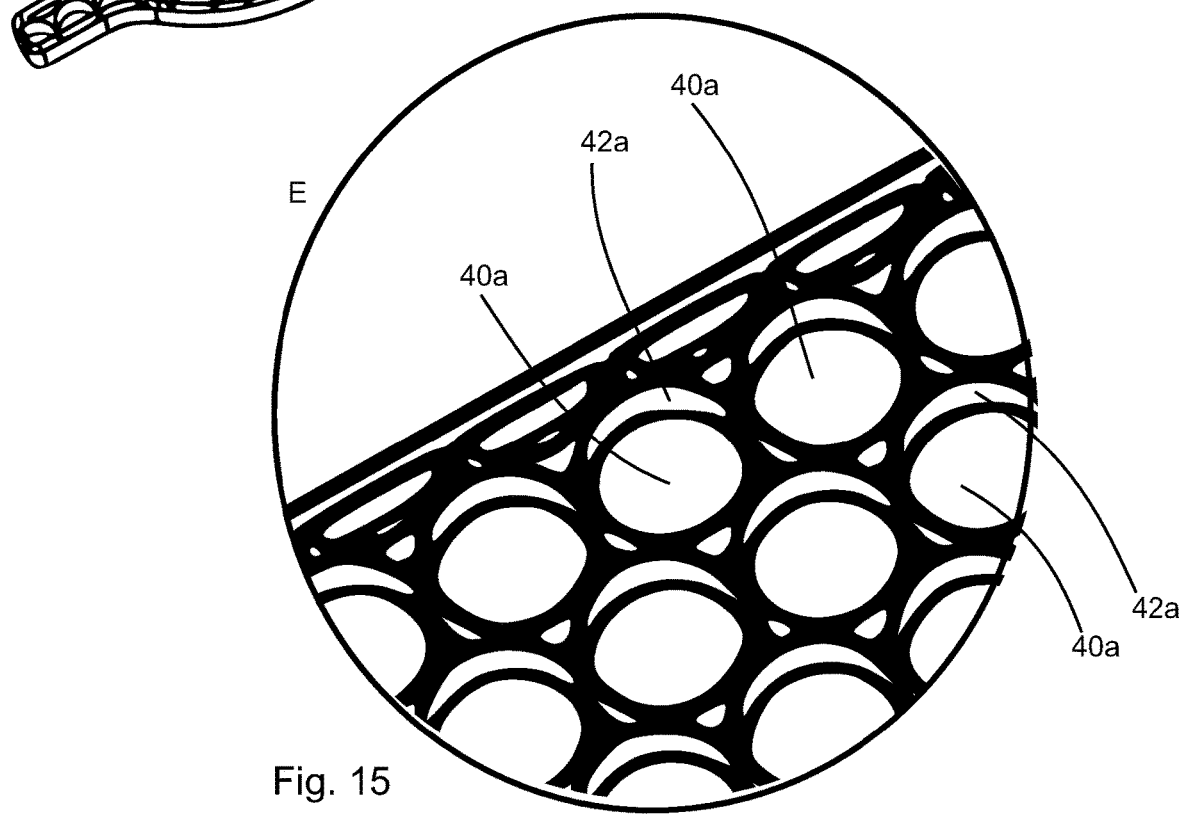
FIG. 15 is a magnified view of section E of FIG. 14.
Figure 16:
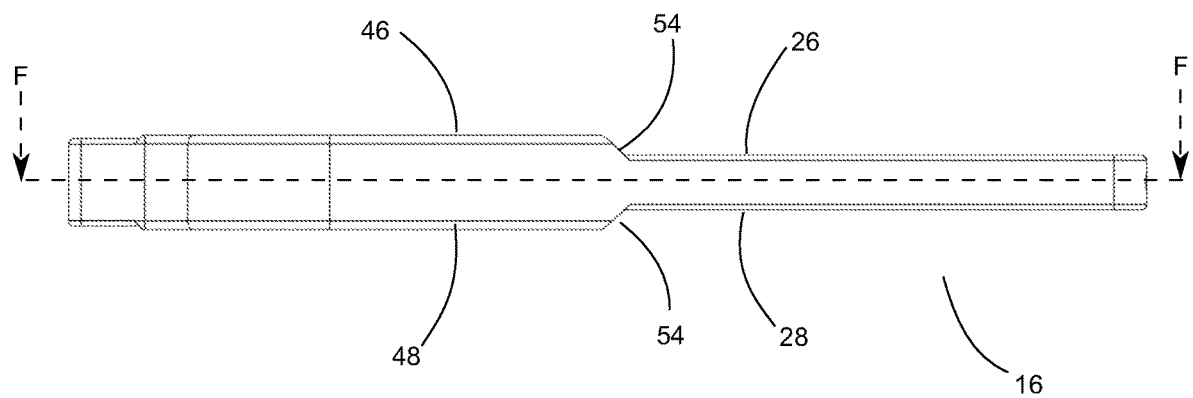
FIG. 16 is a front view of a saw guide in accordance with yet another embodiment of the invention.

FIGS. 12 to 15 depict another embodiment of the saw guide 16. In this embodiment, the exterior of the saw guide 16 is substantially similar to that shown in FIGS. 6 and 7. However, as shown in FIG. 13, which is a cross-sectional view of the saw guide 16, the interior of the saw guide 16 comprises a lattice structure 38a comprising a plurality of repeating cells 40a that are substantially circular in shape (instead of hexagonal, as in the previous embodiment). Each of the cells 40a comprises a cell wall 42a that is curved to form a substantially circular shape, as best shown in FIG. 15, which is a magnified view showing the cells 40a. Preferably, the cells 40a are enclosed. The cell walls 42a of adjacent ones of the cells 40a may contact each other in order to form the lattice structure 38a, as shown in FIG. 15. Preferably, the cell walls 42a within the body 24 are substantially perpendicular to the first and second body surfaces 26, 28, while the cell walls 42a within the head 22 are substantially perpendicular to the first and second head surfaces 46, 48.

As with the previous embodiment, the lattice structure 38a preferably extends throughout substantially an entirety of the interior of the head 22 and the body 24. Where the lattice structure 38a extends in both the head 22 and the body 24, the lattice structure 38a may be bound horizontally, at least in part, by the head sidewall 52, the collar wall 50, and the body sidewall 29. Furthermore, the lattice structure 38a may be bound vertically, at least in part, by the first and second body surfaces 26, 28, the first and second head surfaces 46, 48, and the transition surface(s) 54.

For example, the lattice structure 38a may extend within at least the body 24, with the cell walls 42a extending between the first and second body surfaces 26, 28 and bounded by the body sidewall 29.

The passages 34 and the intake channels 32 are accommodated and located within the lattice structure 38a, as shown in FIG. 13.

One or more of the first and second body surfaces 26, 28, the body sidewall 29, the first and second head surfaces 46, 48, the head sidewall 52, the collar wall 50, and the cell walls 42a may be made from metal (including, but not limited to, aluminum or steel) and may be manufactured using 3D printing techniques.

Although FIGS. 6 to 15 depict embodiments of the lattice structure 38, 38a comprising cells 40, 40a in a substantially hexagonal or circular shape, respectively, it is also understood that different shapes and configurations for the lattice structure 38 are possible. By way of example only, the cells 40 may be also rectangular, triangular, pentagonal, or octagonal in shape. Similarly, the cells 40 may also oval or elliptical in shape. The lattice structure 38 may also comprise cells 40 that include a combination or mixture of different shapes.

Figure 17:
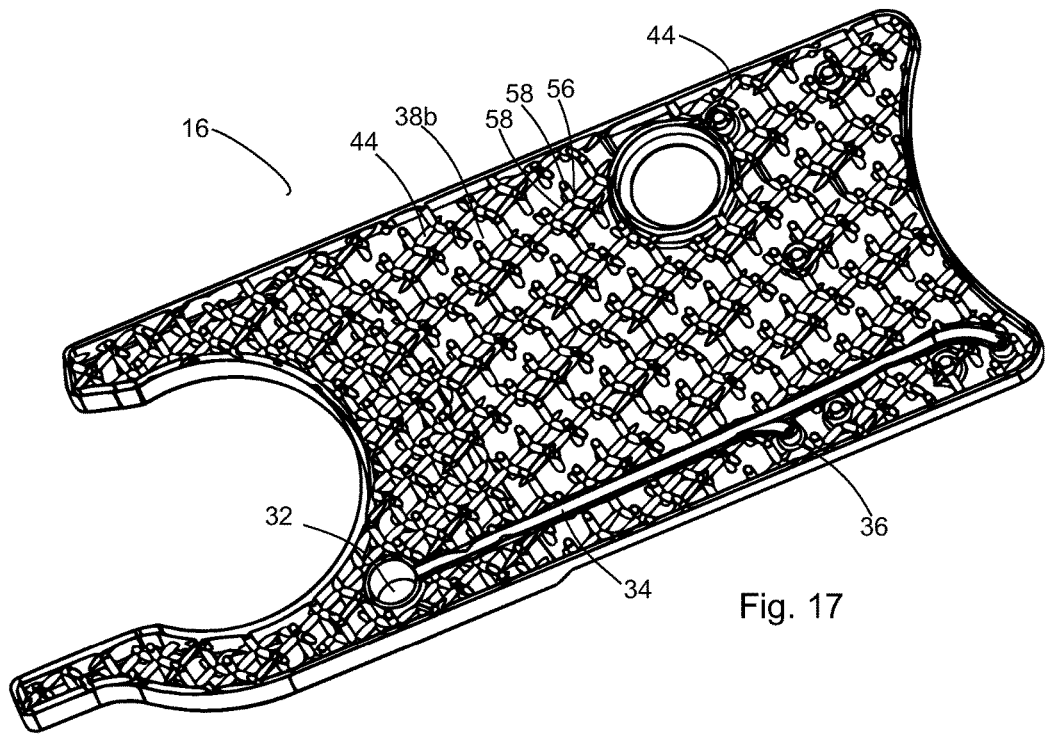
FIG. 17 is a cross-sectional view of the saw guide of FIG. 16, taken along F-F.
Figure 18:
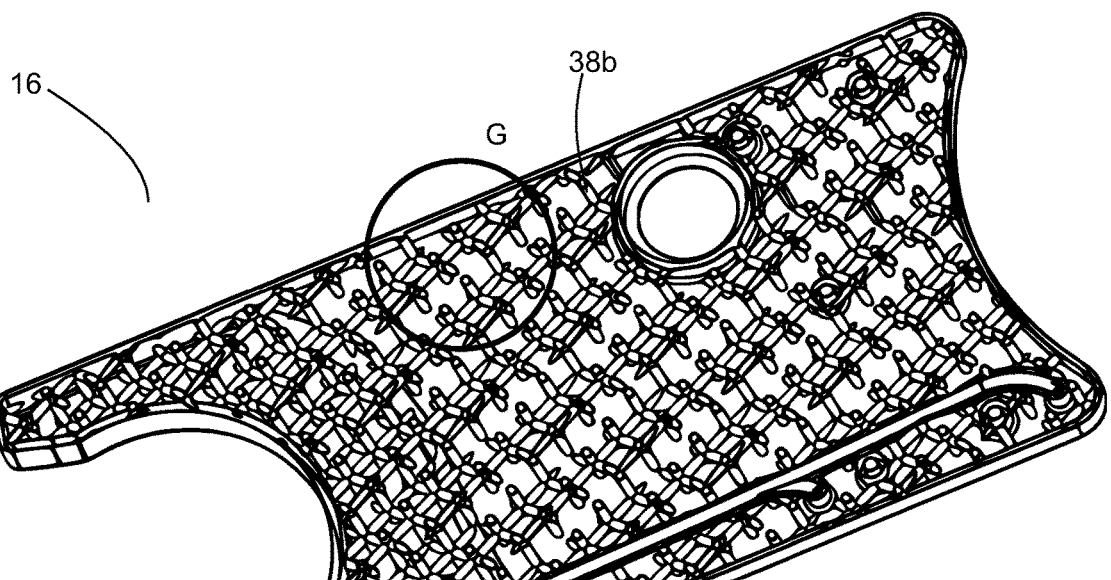
FIG. 18 is another cross-sectional view of the saw guide of FIG. 16.
Figure 19:
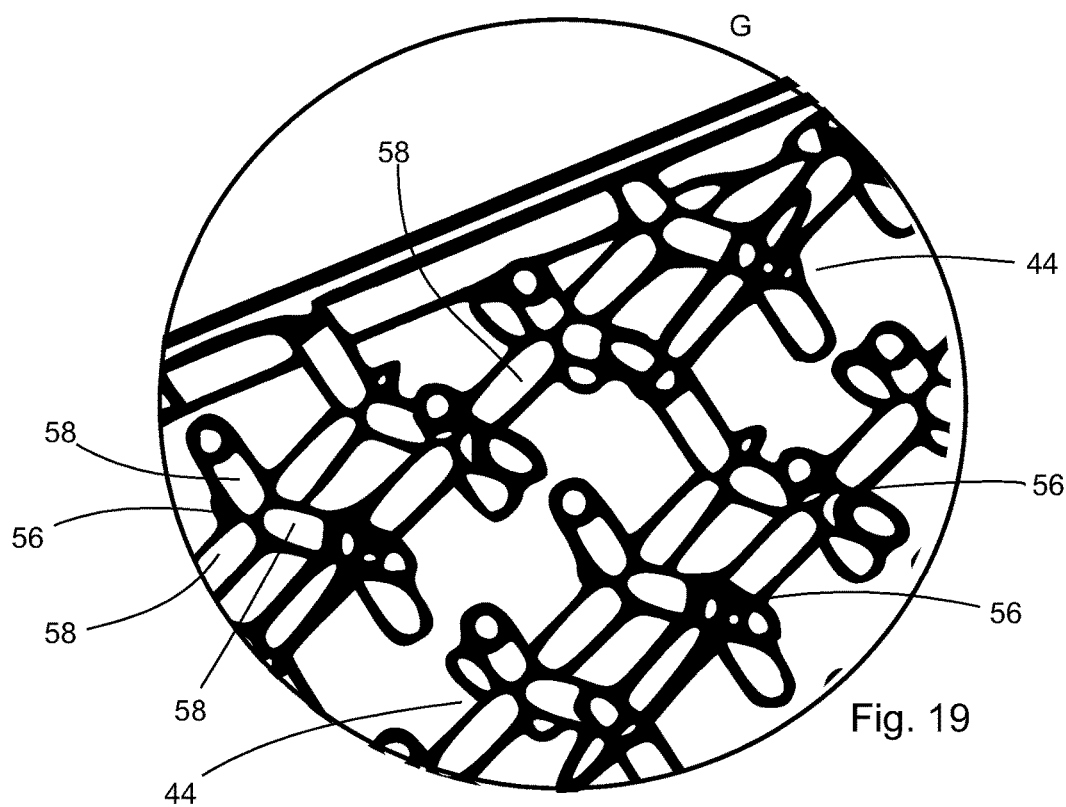
FIG. 19 is a magnified view of section G of FIG. 16.

FIGS. 16 to 19 depict yet another embodiment of the saw guide 16. In this embodiment, the exterior of the saw guide 16 is substantially similar to that shown in FIGS. 6 and 7. However, as shown in FIG. 17, which is a cross-sectional view of the saw guide 16, the interior of the saw guide 16 comprises a lattice structure 38b comprising a plurality of repeating rod structures 44. Each of the rod structures 44 preferably comprises a central point 56 and a plurality of rods 58 extending from the central point 56. Preferably, the rods 58 are substantially cylindrical in shape and extend from the central point 56 in three orthogonal axes (i.e. in the x-, y-, and z-axes), as best shown in FIG. 19, which is a magnified view showing the rod structures 44. Some of the rods 58 may be shared between adjacent ones of the rod structures 44.

As with the previous embodiments, the lattice structure 38b preferably extends throughout substantially an entirety of the interior of the head 22 and the body 24. Where the lattice structure 38b extends in both the head 22 and the body 24, the lattice structure 38b may be bound horizontally, at least in part, by the head sidewall 52, the collar wall 50, and the body sidewall 29. Furthermore, the lattice structure 38b may be bound vertically, at least in part, by the first and second body surfaces 26, 28, the first and second head surfaces 46, 48, and the transition surface(s) 54.

For example, the lattice structure 38b may extend within at least the body 24, with a number of the rod structures 44 extending between the first and second body surfaces 26, 28 and bounded by the body sidewall 29.

The passages 34 and the intake channels 32 are accommodated and located within the lattice structure 38b, as shown in FIG. 17.

One or more of the first and second body surfaces 26, 28, the body sidewall 29, the first and second head surfaces 46, 48, the head sidewall 52, the collar wall 50, and the rods 58 may be made from metal (including, but not limited to, aluminum or steel) and may be manufactured using 3D printing techniques.

In addition to the lattice structure 38b comprising the plurality of repeating rod structures 44, the lattice structure 38b may also comprise other repeating structures, such as a gyroid structure or other three-dimensional structures.

In the embodiments described above, the saw guide 16 comprises one or more enclosed cavities or voids. For example, in the embodiment shown in FIGS. 6 to 11, one or more of the cells 40 comprise an enclosed cavity or void (e.g. bounded by the cell walls 42). Similarly, in the embodiment shown in FIGS. 12 to 15, one or more of the cells 40 comprise an enclosed cavity or void (e.g. bounded by the curved, substantially circular, cell walls 42a). In the embodiment shown in FIGS. 16 to 19, there is a single enclosed cavity that extends substantially within the saw guide 16, with the plurality of rod structures 44 arranged within the single enclosed cavity.

As described above, the saw guide 16 in accordance with the invention is no longer substantially solid but are at least partially hollow (as a result of the enclosed cavities or voids). This reduces the amount of material (e.g. metal material) required to manufacture the saw guide 16, while still retaining sufficient strength and rigidity for the saw guide 16.

It will be appreciated by those skilled in the art that the preferred embodiments have been described in some detail but that certain modifications may be practiced without departing from the principles of the invention.

The invention claimed is:

1. A saw guide for attachment to a guide post of a saw guide arbor guide assembly, the saw guide comprising:
a head comprising:
opposed first and second head surfaces;
a collar wall extending between the first and second head surfaces, wherein the collar wall engages with the guide post; and
a head sidewall extending between the first and second head surfaces and extending along at least a portion of an outer perimeter of the head; and
a body attached to the head, the body comprising:
opposed first and second body surfaces; and
a body sidewall extending between the first and second body surfaces and extending along at least a portion of an outer perimeter of the body;
wherein the saw guide further comprises a lattice structure extending within at least the body, the lattice structure extending between the first and second body surfaces.

2. The saw guide of claim 1, wherein the lattice structure further extends within the head, the lattice structure extending between the first and second head surfaces.

3. The saw guide of claim 2, wherein the lattice structure is bound horizontally by the collar wall, the head sidewall, and the body sidewall.

4. The saw guide of claim 2, wherein the lattice structure is bound vertically by the first and second head surfaces and the first and second body surfaces.

5. The saw guide of claim 1, wherein the lattice structure comprises a plurality of repeating hexagonal cells, wherein the hexagonal cells are defined by a plurality of cell walls.

6. The saw guide of claim 5, wherein the cell walls extend between the first and second body surfaces.

7. The saw guide of claim 6, wherein the cell walls extend substantially perpendicularly to the first and second body surfaces.

8. The saw guide of claim 1, wherein the lattice structure comprises a plurality of repeating circular cells, wherein the circular cells are defined by a circular cell wall.

9. The saw guide of claim 8, wherein the cell walls extend between the first and second body surfaces.

10. The saw guide of claim 9, wherein the cell walls extend substantially perpendicularly to the first and second body surfaces.

11. The saw guide of claim 1, wherein the lattice structure comprises a plurality of repeating rod structures, wherein the rod structures comprise:
a central point; and
a plurality of rods extending from the central point.

12. The saw guide of claim 11, wherein the plurality of rods comprises three rods.

13. The saw guide of claim 12, wherein the three rods extend from the central point substantially orthogonal to each other.

14. The saw guide of claim 11, wherein the rods are substantially cylindrical in shape.

* * * * *